United States Patent Office 2,830,074
Patented Apr. 8, 1958

2,830,074

SYNTHETIC ANDROGENS, 13-METHYL-ACETO POLYHYDROPHENANTHRENE DERIVATIVES AND PREPARATION THEREOF

Nicholas Thomas Farinacci, New York, N. Y.

No Drawing. Application September 18, 1956
Serial No. 610,625

26 Claims. (Cl. 260—468)

This invention relates to Δ(8,14) unsaturated 2-aceto-13-methyl polyhydrophenanthrones-7 and those having other such 2-substituents as are set forth herein, and to the production, thereof, from pine resin acid derivatives and such of their derivatives whose preparation is described in the referred to herein copending applications. Particularly, this invention relates to 13-methyl-aceto-and esterified or free carboxy-polyhydrophenanthrone derivatives of the type such as

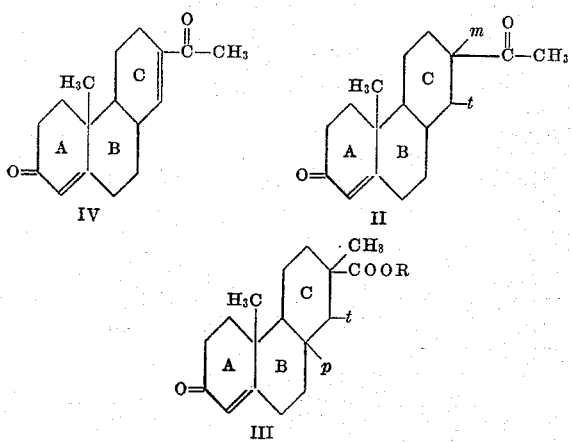

wherein the $m$, $t$ and $p$ substituents in II or III are selected from the group consisting of halogen and hydrogen, and R is selected from the group consisting of hydrogen, alkyl and aryl residues, and the preparations, thereof. The —COOR group in III may be replaced by a group such as —COCH$_3$, —CHpCH$_2$t, —CHOHCH$_3$, —CH=CH$_2$ or —CHOHCH$_2$OH, in accordance with appropriate modifications of the invention and variations thereof.

I have discovered a process for the manufacture of said polyhydrophenanthrene derivatives which involves rearrangement-dehydration and oxidation reactions of nuclearly saturated and nuclearly unsaturated tertiary diphenyl carbinols of the abietyl and d-pimaryl group and of such as the corresponding aceto polyhydrophenanthrene tertiary carbinols of the type, such as, for example, nuclearly saturated halogenated

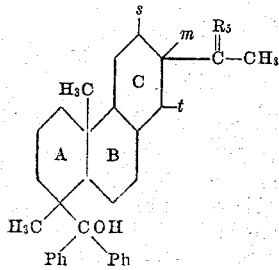

wherein Ph is phenyl and at least one of the $s$, $m$ and $t$ groups being halogen and the other a member of the group consisting of halogen and hydrogen and R$_5$ is a member of the group consisting of $$(=O) \text{ and } (H \diagdown CH_3)$$

which are prepared and described according to copending applications Serial Nos. 198,893-4-5, filed December 2, 1950, and corresponding applications Serial Nos. 416,433-4 (refiled as applications Serial Nos. 610,623 and 610,624) and Serial No. 428,852 based thereon, which descriptions and relevant subject matter are hereby incorporated, herein. In general said polyhydrophenanthrene-8-tertiary diphenyl carbinols, having the 2-isopropyl group are prepared by Grignard reaction as with phenyl magnesium halides of the corresponding Δ(7,8) dihydro-levopimaric alkyl and aryl acid esters, as set forth in detail in such as Examples 1 and 2 of copending application Serial No. 416,433 (refiled as application Serial No. 610,623) and the corresponding carbinol halides are prepared as in Examples 1–3 of copending application Serial No. 416,434 (refiled as application Serial No. 610,624) by halogenation or hydrohalogenation of said nuclearly monounsaturated dihydrolevopimaryl tertiary diphenyl carbinols and in accordance with the method of preparation as set forth in Examples 1–3, copending application Serial No. 428,852, the 2-isopropyl group of said carbinol halides is selectively oxidized with hexavalent chromium compounds to provide the corresponding 2-aceto halogenated-13-methyl polyhydrophenanthrene-8-tertiary diphenyl carbinols, said 2-aceto-carbinols exemplified, for example, in the starting material of Example 3, herein.

The rearrangement-dehydration and oxidation steps involve the reaction of said tertiary carbinols with suitable water-abstracting agents such as toluene, acid anhydrides, acyl halides and the like and reaction of the resulting rearranged carbinol dehydrates with suitable oxidizing agents, preferably, such as the hexavalent chromium compounds in neutral or acidic medium, preferably, in an organic carboxylic acid such as glacial acetic acid or its anhydride at moderately low temperatures for a period up to several hours.

Although a preferred scheme for the rearrangement-dehydration and oxidation process of this invention comprises reaction of a nuclearly saturated halogenated abietyl or di-pimaryl type of tertiary diphenyl carbinol with an excess of dehydrating agent such as phosphoric pentoxide in such a glacial acetic acid at temperatures below 80° C. to effect first rearrangement-dehydration and then reaction with a mixture comprising a hexavalent chromium compound such as CrO$_3$ and an orthophosphate-ion producing compound such as orthophosphoric acid or an anhydride thereof, at temperatures preferably below 50° C., to effect oxidation of the rearranged carbinol dehydrate, it will be immediately apparent to one skilled in the art that specific reagents and the proportions and concentrations of reactants, as well as temperatures and periods of the reactions, may be varied within wide limits and that the alkane carboxylic acid reaction-medium may be replaced by inert acid anhydrides or by suitable inert solvents such as chloroform, carbon tetrachloride, acetone and the like. For example, rearrangement-dehydration and oxidation reactions may be carried out over a fairly wide temperature range, varying from 5° C. to as high as 80° C. or up to 150° C. At the higher temperatures the rearrangement-dehydration and oxidation reactions are completed within a few hours while at 5° C., reaction may require several days to reach completion. The dehydration agents may be such as phosphoric or sulfuric or acetic or anhydrides in general and the like but are not limited to anhydrides and include other suitable water-abstracting agents such as toluene and toluene-sulfonates and such as acyl halides and the oxidizing agents suitably and preferably may be hexavalent chromium compound such as hexavalent chromic oxide, a chromate, bichromate or chromyl compound and mixtures of these agents with inert solvents such as water, alkanoic acids, tertiary alcohols, ketones, hydrocarbons and halogenated hydrocarbons and their derivatives which are suitably inert with respect to the oxidation step of the invention.

The starting material may be the nuclearly unsaturated abietyl and d-primaryl types of tertiary diphenyl carbinols which comprise those having nuclear monene structures such as the $\Delta(6,7)$ and $\Delta(7,8)$ dihydrolevopimaryl and $\Delta(8,14)$ neoabietyl and also d-pimaryl nuclei and nuclear dienes $\Delta(9,14)(7,8)$ abietic and $\Delta(14,8)(6,7)$ levopimaric nuclei and the nuclear triene and tetraene nuclei, dehydroabietyl and $\Delta(9,10)$ dehydroabietyl nuclei, respectively, and thus as desirable or necessary the overall process may include the step of protectively saturating the ring nucleus with addends (with or without isomerization) such as halogens as in Examples 1-4, or halogen hydrides, and said protected derivative may be rearranged-dehydrated and oxidized and the addend removed, if desired, thus simplifying the over all process with steps which comprise additions of such as saturating halogen, rearrangement-dehydration, oxidation and restoring the unsaturated bonds, with suitable intervals and suitable regulation of temperatures, thus effecting a continuous over all process in one batch.

As known, in oxidations of nuclear diene and monene compounds, some ring cleavage of the C-ring occurs resulting in substituted polyhydronapthalene compounds, namely cleavages across the double bonds in neoabietyl, dextropimaryl and levopimaryl, and the corresponding dihydrolevopimaryl monenes. These result in corresponding polyhydronapthalenes having as a substituent on the 1-position a member of the group consisting of
—$CH_2COOH$, —$CH_2$—$CH_2$—$CO$—$COOH$

—$CH_2$—$CH_2$—$CO$—$CH(CH_3)_2$

—$CH_2$—$CH_2$—$(CO)_2$—$CH_3$

—$CH_2$—$CH_2$—$C(CH_3)_2$—$C_2H_5$

—$CH_2$—$CH_2$—$C(q)(CH_3)$—$COOH$ wherein $q$ is selected from the group consisting of OH, —$COCH_3$, —$CHpCH_2t$, and —$COOR$ (wherein R is selected from the group consisting of hydrogen, alkyl, and aryl radicals), and on the 2-position a member of the group consisting of —$CH_2$—$CO$—$CH(CH_3)_2$, —$CH_2$—$(CO)_2$—$CH_3$, =O, and —$COOH$ (see Harris et al. Jour. Am. Chem. Soc., vol. 70, pp. 340 and 2083 (1948), and Fieser et al., Natural Products Related to Phenanthrene, 3rd ed. (1949), chap. II, pages 56 and 65, particularly).

This process also is applicable, as illustrated in examples herein, to isomers of abietyl tertiary carbinols indicated in the examples for the d-pimaryl series to produce the corresponding 13-methyl phenanthrones which illustrations are noted to refer to the overall process starting from the pine resin acid esters and illustrative therein, of the utility of inventions in the several copending applications as applied to the d-pimaryl types of compounds.

The products which are produced from the halogenated dihydrolevopimaryl tertiary diphenyl carbinols include the corresponding halogenated aceto-phenanthrenes having the formula

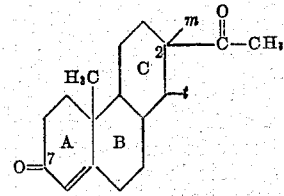

wherein at least one of the $m$ and $t$ groups being halogen and the other a member of the group consisting of halogen and hydrogen. This may be isolated from the organic residue obtained from the reaction mixture by purifying with such as petroleum ether and alkali, washing to separate the neutral halogenated oxidized products, therefrom. The unsaturated aceto-polyhydrophenanthrone having the formula

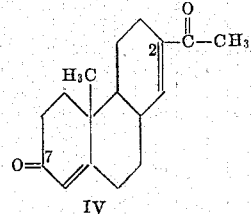

may be obtained by dehalogenating with zinc in acetic acid, or with sodium iodide in alcohols, and the like or by dehydrohalogenating the monohalides with pyridine bases and the like.

The new said 13-methyl-2-aceto-7-keto polyhydrophenanthrene IV, of this invention promotes comb-growth in capons and therefore has androgenic hormonal properties. This product and its derivatives may serve as intermediates for the manufacture of some of the conventional steroid hormones as may also the other phenanthrones described herein, since these compounds particularly have the steroid type of configuration.

The androgenic hormones have been used for the purpose of controlling pituitary gonadotrophin secretions. Thus, androgenic hormones such as testosterone and the like, in certain dosages, are known to inhibit pituitary hormone secretion and also to provide beneficial metabolic functions. However, it is well known that the usual production of androgenic hormones from sterols and saponins is relatively very costly. Thus the economical production of androgenically active hormones having this property of male gland hormones is therefore highly desirable. It is an object of this invention to provide new androgenically active substances at low cost and corresponding useful intermediates for conventional hormone production.

The aceto polyhydrophenanthrones and derivatives thereof, which are comprised in this invention are new and useful compositions in the field of therapeutics by virtue of their ability to affect secretion of hormones by the pituitary gland and their androgenic properties and metabolism-affecting properties. More particularly, new compositions of this invention are useful and valuable in medicine for the control of certain glandular disorders because they are androgenically active.

The androgenic hormones in addition to their specific effects on the sexual and reproductive systems have other general metabolic effects. The androgens stimulate protein anabolism in animals and man. This valuable property has found wide therapeutic use. The substances of this invention indicate similar metabolic effects in the capon growth cycle and fulfill the need for the economical production of metabolism-stimulating androgenic materials. It is to be understood that the utility of the substances described and claimed in this application is not dependent on the mode of action, thereof, or on the current knowledge and theories relating to physiological processes.

Acetopolyhydrophenanthrones and derivatives thereof, may be prepared in accordance with the invention from suitably constituted abietyl type of tertiary diphenyl carbinols and the corresponding aceto-polyhydrophenanthrene tertiary carbinols as specifically disclosed and illustrated in the following examples (quantities of reactants are given in part by weight). Included therein, are the dehydroabietyl type of tertiary diphenyl carbinols. The suitably constituted d-pimaryl type of tertiary diphenyl carbinols also may be converted to corresponding phenanthrones by the process of this invention, that is, 7-aceto and 7-glycol d-pimaryl tertiary diphenyl carbinols provide corresponding 2-aceto polyhydrophenanthrones. The said 7-aceto- and 7-glycol-d-pimaryl tertiary diphenyl carbinols, respectively, are generally prepared as by selective oxidation with hexavalent chromium compounds of the 7-side chain of the corresponding 2-hydroxyethyl-2,13-dimethyl-11,1-halogenated (or hydrohalogenated) polyhydrophenanthrene-8-tertiary diphenyl carbinol and of the 2-vinyl side chain of the corresponding carbinol as with dilute permanganate and thereby to produce, respectively, the corresponding said 2-aceto and 2-glycol tertiary diphenyl carbinols as set forth in detail in such as Examples 5 and 4, respectively, of copending application Serial No. 428,852.

The, in general, preparation of such as the starting materials 7-carboxy-R d-pimaryl tertiary diphenyl carbinols is as set forth in Example 4, herein, and as set forth in detail in Example 4, of copending application Serial No. 428,852, wherein the preparation of such as 2-carboxyphenyl-11-chloro-2,8,13-trimethyl polyhydrophenanthrene-8-tertiary diphenyl carbinol by esterification with phenol of the 7-carboxy-d-pimaryl tertiary diphenyl carbinol followed by hydrochlorination to produce the said 2-carboxyphenyl derivative and the preparation of corresponding 7-carboxy-R d-pimaryl tertiary diphenyl carbinols such as the corresponding 2-carboxymethyl polyhydrophenanthrene-8-tertiary diphenyl carbinol by esterification of the said 7-carboxy-d-pimaryl tertiary diphenyl carbinol with methanol and esterification with other alkyl and aryl monohydric alcohols to produce corresponding 2-carboxy-R polyhydrophenanthrene-8-tertiary diphenyl carbinols as set forth in said Example 4, of said application Serial No. 428,852, specification, wherein the halogenation and hydrohalogenation procedures for saturating unsaturated derivatives are set forth in detail and generally indicated herein, as in specification, page 5, lines 7–13, and in Examples 1–5, herein. The examples are merely illustrative in nature and are not to be construed as limiting my invention. The expressions carboxymethyl, carboxyphenyl and such as carboxy-R are defined herein to indicate an ester group.

Example 1

154 grams of Δ(7,8) dihydro-1-primaryl tertiary diphenyl carbinol in 3 liters of glacial acetic acid are treated dropwise with 60 grams of bromine in 100 cc. glacial acetic while stirring for one-half hour at room temperature. There is added 115 grams of $P_2O_5$ while stirring and heating to 70° C. for an hour. The solution of rearranged carbinol dehydrate (tertiary diphenyl methyl compound) ($C_{32}H_{40}Br_2$, C=65.1%) cooled to 40° C., is treated with 230 grams of 85% aqueous phosphoric acid and portionwise with 170 grams of powdered $CrO_3$ with vigorous stirring and temperature control below 50° C. Stirring is continued for at least 45 minutes to complete the oxidation. Chromic phosphate(solvate) is filtered off as precipitate and washed to recover organic material. The combined organic material is recovered with ether, dried and washed with petroleum ether, B. P. 30–60° C. The ethyl-ether solution of residue is washed with aqueous alkali and the recovered 120 grams of crude neutral dibromides are debrominated in a liter of glacial acetic acid with 200 grams of powdered zinc added portionwise over 3 hours while maintaining temperature of 70° C., and 70 grams of crude unsaturated aceto polyhydrophenanthrone are thoroughly washed with petroleum ether to yield 60 grams of neutral product, from which the Δ(1,2)(8,14) 7-keto 2-aceto-13-methyl polyhydrophenanthrene, M. P. 126° C., C 78.5%, H 8.6%, mono-2:4 dinitrophenylhydrazone 12.8% N, di-2:4 dinitrophenylhydrazone 18% N, is recovered.

Example 2

31 grams of Δ(7,8) dihydro-1-pimaryl tertiary diphenyl carbinol, prepared as in copending application Serial No. 198,893 (refiled as continuation-in-part as application Serial No. 416,433 and as continuation-in-part thereof as application Serial No. 610,623), is dissolved in 600 cc. of glacial acetic and treated with 12 grams of bromine in 200 cc. glacial acetic with stirring at 25 to 30° C., for one-half hour. The solution is treated with 100 grams of acetic anhydride and heated to 80° C., while stirring for an hour. The solution of rearranged carbinol dehydrate (tertiary diphenyl methyl compound) ($C_{32}H_{40}Br_2$, C=65.1%) is cooled to 30° C. and is then treated with a mixture of 20 grams of $P_2O_5$ and 30 grams of 85% aqueous phosphoric acid and then with 50 grams of powdered $K_2CrO_4$ while stirring vigorously and maintaining the temperature below 45° C., over the period of an hour. The chromic phosphate solvate is filtered and washed with ethyl ether on the funnel to recover the brominated organic products. The acetic-phosphoric solution of products is diluted with an equal amount of water and the organic material recovered with dichlorethane and freed of solvent under vacuo. The products are freed of acids and thoroughly washed with petroleum ether as in Example 1, and the 22 grams of crude neutral brominated products are recovered from which a product is obtained by crystallization from ether $C_{17}H_{22}O_2Br_2$, percent bromine 38.5. This product is treated with 40 grams of zinc dust in 200 grams of glacial acetic between 50 and 70° C., with 15 minutes refluxing after 3 hours. There is recovered 10 grams of neutral product from which the Δ(1,2)(8,14) 7-keto 2-aceto-13-methyl polyhydrophenanthrene $C_{17}H_{22}O_2$, whose mono-2:4 dinitrophenylhydrazone derivative sinters at 150° C. and analyzes 12.8% N is obtained.

Example 3

200 grams of 1,2-dibromo-2-aceto-polyhydrophenanthrene tertiary diphenyl carbinol having the formula

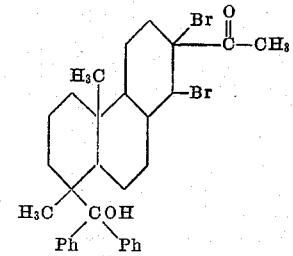

wherein Ph is phenyl, prepared according to process of copending application Serial No. 198,895 (refiled as Ser. No. 428,852) are dissolved in 3 liters carbon tetrachloride and treated with 115 grams of dry $P_2O_5$, stirring and heating to 70° C. for one hour, and the cooled solution of the resulting 2-aceto-1,2-dibrom-13-methyl Δ(8,14) polyhydrophenanthrene-8-tertiary diphenyl methyl, having the formula

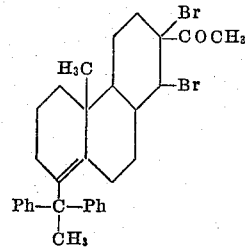

wherein Ph denotes phenyl, rearranged carbinol dehydrate ($C_{31}H_{36}OBr_2$, 63.5% C.), is treated with 150 grams of 85% $H_3PO_4$ and 95 grams of $CrO_3$ at 50° C. for 4 hours as in Example 1. The dried organic residue is washed with petroleum ether and aqueous alkali as in Example 1, to recover the crude corresponding dibrom-aceto-polyhydrophenanthrone which may be dehalogenated to produce the unsaturated Δ(8,14)(1,2) 2-aceto polyhydrophenanthrone-7 as in Example 1.

Example 4

10 grams of 7-carboxymethyl tertiary diphenyl carbinol, (prepared as described in copending application Serial Nos. 198,893-4-5 (refiled as Ser. Nos. 416,433-4 (and 610,623-4) and 428,852), from nuclearly saturated dibrom-d-pimaryl ethyl ester by oxidation of the side chain, dehalogenation, grignardization and esterification whose dibromide has the structure

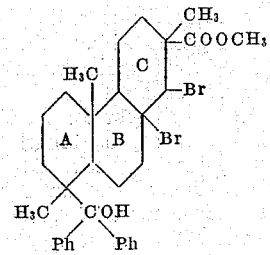

which gives a 62.3% dehydrated rearranged carbinol ($C_{32}H_{38}O_2Br_2$), dissolved in 200 grams of glacial acetic acid is treated with 4 grams of bromine with stirring for 30 minutes. There is added 15 grams of $H_2SO_4$ (95%) and heat applied to 70° C. for 30 minutes. The mixture of rearranged carbinol dehydrate, (2-carboxymethyl-11,1-dibrom-2,13-dimethyl $\Delta(8,14)$ polyhydrophenanthrene-8-tertiary diphenyl methyl), is treated with 38 grams of 85% aqueous $H_3PO_4$ and 10 grams of anhydrous $CrO_3$ which is added with stirring over 30 minutes while maintaining the temperature below 60° C. The organic residue which is recovered in ethyl ether is washed with aqueous alkali, dried and extracted with petroleum ether, dried, then debrominated with 30 grams of powdered zinc while dissolved in 100 cc. glacial acetic acid; 3 grams of 7-keto $\Delta(1,11)(8,14)$-2,13-dimethyl-2-carboxymethyl polyhydrophenanthrene are recovered as an oily product, C is 75.5%, H is 8.1%, saponification value 196. The phenyl ester may be also used as produced by the esterification step and according to this example to produce corresponding carboxyphenyl polyhydrophenanthrone-7.

Example 5

2 grams of 14,8-dibromo-7-aceto-d-pimaryl tertiary diphenyl carbinol prepared as described in copending application Serial No. 198,895 (refiled as Ser. No. 428,852) is treated as in Example 4, to produce 0.9 gram of $\Delta(8,14)(11,1)$-2-aceto-2,13-dimethyl polyhydrophenanthrone-7. Similarly the corresponding dihalogenated-7-glycol-d-pimaryl tertiary diphenyl carbinol is converted to the corresponding $\Delta(8,14)$-2-aceto-2,13-dimethyl polyhydrophenanthrene-8-tertiary diphenyl methyl derivative ($C_{32}H_{38}OBr_2$, 63.1% C.), in the first rearrangement-dehydration step and the invention process applied as in Example 4 produces 1.3 grams of corresponding $\Delta(8,14)(11,1)$ 2-aceto-2,13-dimethyl polyhydrophenanthrone-7, from 3 grams of corresponding carbinol.

Example 6

In like manner as in the above examples, treatment of dehydroabietyl tertiary carbinol (prepared by Grignard reaction of esters as described in Examples 1 and 2 of copending application Serial No. 416,433 and Serial No. 610,623) is converted with $P_2O_5$ to the corresponding rearranged carbinol dehydrate, the tertiary diphenyl methyl product ($C_{32}H_{38}$, 91.2% C, $a_D$=44.1°, M. P. 172° C.) which on reaction with $CrO_3$ and 85% aqueous $H_3PO_4$ is converted to the $\Delta(8,14)(11,1)(2,3)(4,12)$ 7,10-diketo-2-aceto polyhydrophenanthrene (having aromatized C ring).

Example 7

5 grams of d-pimaryl tertiary diphenyl carbinol is converted to a $\Delta(5,10)$ 2,6-diketo-9-methyl polyhydronaphthalene-1-($\alpha$-methyl-$\alpha$-carboxy)butyric acid product by the procedure as in Example 6. The carbinol tetrabromide (or dihydrochloride) in accordance with Example 3 or 4 provides $\Delta(8,14)(11,1)$-7-keto-2,13-dimethyl-2-ethene polyhydrophenanthrene; three grams of which dissolved in 100 cc. of a 50-50 mixture of acetone-water solution containing 5% $H_2SO_4$ and stirred for 4 hours at about 0° C. provide 0.5 gram of the $\Delta(8,14)(11,1)$ - 7 - keto - 2,13 - dimethyl - 2 - hydroxyethyl polyhydrophenanthrene. Similarly 0.8 gram of the corresponding 2-glycol compound is obtained from 3 grams of the 2-ethene compound by stirring with a 100 cc. of a 5% $KMnO_4$ in a 50-50 acetone-water solution for 3 hours at about 0° C. Accordingly, the substituted polyhydronaphthalenes and compounds of Formula III noted above are produced by such modifications of the invention process. Such compounds are also obtained as side products in the above examples.

The temperature at which the dehydration reaction is carried out will depend on the dehydration agent. For example, with acetic anhydride the dehydration is carried out at a temperature of above 60° to 110° C., with toluene a reflux temperature of about 110° C. is used and with milder dehydrating agents the temperature of dehydration, for example, anhydrous chromic acid without addition of other dehydrating agent both the dehydration and oxidation may be carried out at as high as 150° C. The acyl halides permit lower temperatures for effective dehydration in the range of about 5° to about 55° C. and the use of a dehydrating agent which is insoluble in the reaction medium requires that effective contact of the carbinol with the solid phase containing the dehydrating agent is made.

The nomenclature, numbering, structures and configuration are defined in this specification and claims for the phenanthrene series to conform with those of Jour. Am. Chem. Soc. 55 3905 (1933), and those for the abietyl and d-pimaryl series to conform with Fieser et al. in Jour. Am. Chem. Soc. 60 159 (1938), and in Natural Products Related to Phenanthrene, chap. II, 3rd ed. (1949), and are hereby incorporated, herein.

Suitably protected halogenated tertiary diphenyl carbinols in the abietyl and d-pimaryl group of the phenanthrene series of compounds are defined to include such ring saturated derivatives having the 8,13-dimethyl tricyclic ring structure and the general formula

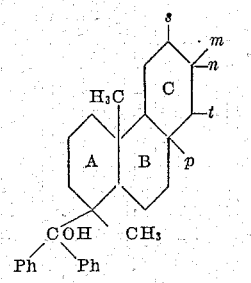

wherein Ph is phenyl, $p$, $t$ and $s$ are each selected from the group consisting of halogen and hydrogen, $m$ is selected from the group consisting of hydrogen, halogen and methyl and $n$ is selected from the group consisting of —$CH(CH_3)_2$, —$COCH_3$, —$CH=CH_2$, —$CHOHCH_3$, —$CHOHCH_2OH$, —$COOR$ (wherein R is selected from the group consisting of hydrogen, alkyl and aryl radicals) and —$CHpCH_2t$ (wherein $p$ and $t$ are each selected from the group of halogen and hydrogen). Ring A is defined to have substituents-8,13-dimethyl-8-tertiary diphenyl carbinol and the indicated structure. In accordance with embodiments of the invention overall process illustrated as in examples herein, in general, the carbinols on mixing with dehydrating agents and heating are converted to corresponding rearranged-carbinol-dehydrates, the tertiary diphenyl methyl derivatives, which include those resulting from the above said halogenated carbinols having the 13-methyl tricyclic nucleus,

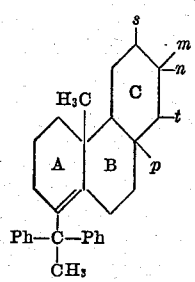

and compositional formula $(C_{29}H_{31}smntp$ wherein Ph, $p, t, s, m$ and $n$ are defined as in the above and having in ring A the substituents 13-methyl-8-tertiary diphenyl methyl and indicated structure.

It is contemplated the invention, herein, broadly is applicable to tertiary diphenyl carbinols containing the bicyclic ring residue having the formula

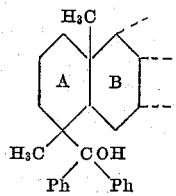

wherein the angular methyl group and the tertiary diphenyl carbinol group are deemed to be in trans relation with each other. The tertiary diphenyl carbinols derived from the abietyl and d-primaryl groups of the phenanthryl series of compounds are found to have said residue in which angular methyl and tertiary diphenyl carbinol groups are deemed to be in trans relation with each other. Such tertiary diphenyl carbinols, approximately, are contemplated as suitable for the invention herein, particularly, such as the halogenated and aceto-tertiary diphenyl carbinols and the like, disclosed in copending applications (Serial Nos. 198,893-4-5, refiled as Serial Nos. 416,433-4 (and Serial Nos. 610,623 and 610,624), Serial No. 428,852). In general, the invention is applicable to the tertiary diphenyl carbinols of such derivatives of the abietyl and d-primaryl groups as may be substituted by hydroxyl, carbonyl, halogen, carboxyalkyl and the like and which may have saturated or aromatic C rings, including, for example, the related $\Delta(9,10)$ dehydroabietyl diphenyl tertiary carbinol derivatives wherein conjugated unsaturation extends to the B ring.

It is desirable that for such derivatives of the abietyl and d-pimaryl groups of the phenanthryl series of compounds as may be produced in accordance with the invention from corresponding tertiary diphenyl carbinols thereof, the tricyclic ring system should be intact and by virtue of protective substitution such as with halogenation of the C-ring and also aromatization, thereof, the tricyclic ring system tends to be inert to oxidative fissure, thereof, so that in accordance therewith, such compounds may be produced which have intact tricyclic ring systems and intermediates, following a re-arrangement-dehydration step rearranged-carbinol-dehydrate intermediates, the tertiary diphenyl methyl derivatives, are found to be produced having typical A ring structure.

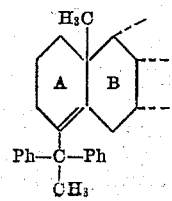

In the second step of the invention, oxidation as set forth herein, converts the intermediate rearranged carbinol dehydrates, tertiary diphenyl methyl compounds, to the typical alpha-beta unsaturated ketonic A ring structure

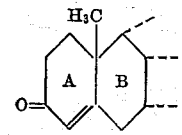

In the course of the transformation of such tertiary diphenyl carbinols to such corresponding alpha-beta unsaturated ketones it is contemplated that concurrently dehydration and oxidation may occur at other locations, for example, dehydration of the hydroxylated side chain

$(-CHOHCH_2OH)$ in a d-primaryl-7-glycol tertiary diphenyl carbinol and such as oxidation of isopropyl side chain to aceto- as shown in examples, herein, for halogenated dihydro-1-pimaryl tertiary diphenyl carbinols. Other concurrent reactions may occur as ketonization of ring and side chain hydroxyls and such as ketonization by allylic oxidation of the 9 position of a dehydroabietyl tertiary diphenyl carbinol to produce corresponding polyketones.

In accordance with Fieser and Fieser, loc. cit., definitions and also Fieser and Campbell, loc. cit., the expression, having the double bond adjacent to the isopropyl group conforms to definition of the $\Delta(6,7)$ and $\Delta(7,8)$ dihydrolevopimaryl nuclei, and the term "aromatized abietyl" refers to aromatic C ring for said "abietyl" derivatives.

The foregoing may be summarized as follows.

The starting tertiary carbinol may be represented by the formula

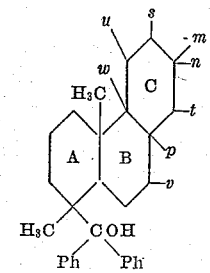

wherein the angular methyl and tertiary carbinol groups are in trans relation. This material is dehydrated by means of the above mentioned dehydrating agents at a temperature in the range of about 5° to about 150° C., preferably below 80° C. In this process the elements of one molecule of water are removed per molecule of carbinol. Simultaneously therewith there is a molecular rearrangement resulting in a compound having the formula

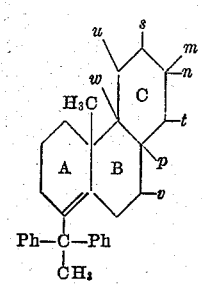

This material is oxidized by means of oxidizing agents, preferably by a hexavalent chromium compound at a temperature in the range of 5° to about 150° C., preferably below 80° C., and this produces a cyclic ketone of the formula

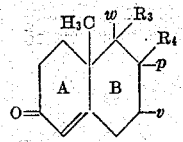

In all the foregoing formulas $v$ is selected from the group consisting of =O, =H$_2$, and one end of a double bond, R$_3$ is selected from the group consisting of —CH$_2$COOH
—CH$_2$—CH$_2$—CO—COOH
—CH$_2$—CH$_2$—CO—CH(CH$_3$)$_2$
—CH$_2$—CH$_2$—(CO)$_2$—CH$_3$
—CH$_2$—CH$_2$—C(CH$_3$)$_2$—C$_2$H$_5$ —CH$_2$—CH$_2$—C(q)(CH$_3$)—COOH, wherein $q$ is selected from the group consisting of —OH, —COCH$_3$, —CHpCH$_2$t, —COOR (wherein R is selected from the group consisting of hydrogen, alkyl and aryl radicals), and one end of a ring forming radical, and R$_4$ is selected from the group consisting of

—CH$_2$—CO—CH(CH$_3$)$_2$

—CH$_2$—(CO)$_2$—CH$_3$, =O, —COOH, and the other end of said ring forming radical, said ring forming radical having the formula

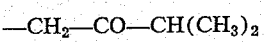

wherein $w$ and $u$ are each selected from the group consisting of hydrogen and one end of a double bond, $s$, $t$, and $p$ are each selected from the group consisting of hydrogen, halogen and one end of a double bond, $m$ is selected from the group consisting of hydrogen, halogen, methyl, and one end of a double bond, said ends of double bonds being in a position selected from the group consisting of the $w$ and $u$, $s$ and $m$, $m$ and $t$, $t$ and $p$, and $p$ and $v$ positions, and $n$ is selected from the group consisting of —eC(CH$_3$)$_2$ (wherein $e$ is selected from the group consisting of hydrogen and one end of a double bond in the $e$ and $m$ position), —COCH$_3$, —CHOHCH$_3$, —CHOHCH$_2$OH, —CHpCH$_2$t, and —COOR, and Ph is phenyl.

The group of inventions comprised in the copending applications as noted below relates to converting the readily available pine resin acids to materials having androgenic activity, which materials may be further converted to natural cyclopentanopolyhydrophenanthrene type of hormones. They are described and claimed in copending applications Serial No. 416,433 (610,623), Serial No. 416,434 (610,624, Serial No. 428,852, Serial No. 441,646 (610,625) and Serial No. 390,747 (647,986).

In this overall process an ester derivative of a pine resin acid is converted to a tertiary carbinol by Grignard reaction.

In this connection there are included an improved method for obtaining high yields of carbinol of the order of 95% of theory by operation at elevated temperatures with high boiling solvents, and also a novel method of recovery of the high yield of desired carbinol product in substantially pure form by degradation and removal of the unreacted acid esters therefrom, and also a method for rearranging and dehydrating the tertiary carbinol products to corresponding tertiary diphenyl-methyl compounds. These novel features and intermediate compounds are described and claimed in application Serial No. 610,623, filed Sept. 18, 1956, as a continuation-in-part of Serial No. 416,433 filed March 15, 1954, as a continuation-in-part of application Serial No. 198,893 filed Dec. 2, 1950, now abandoned.

The class of nuclearly monounsaturated tertiary carbinols obtained thereby are converted to corresponding saturated halides by halogenation or hydrohalogenation which features and carbinol halide products are described and claimed in copending application Serial No. 610,624, filed Sept. 18, 1956, as a continuation-in-part of Serial No. 416,434, filed March 15, 1954, as a continuation-in-part of application Serial No. 198,894 filed Dec. 2, 1950, now abandoned.

The resulting carbinol halides and the corresponding C-ring aromatized tertiary carbinols (obtained as above from the corresponding aromatized pine resin acids) are subjected to selective oxidation which converts the 2-side chain of the polyhydrophenanthrene tertiary carbinol to an alpha carbonyl group, which features and carbinol products are described and claimed in application Serial No. 428,852 filed May 10, 1954, as a continuation-in-part of application Serial No. 198,895 filed Dec. 2, 1950, now abandoned.

The carbinol in the material obtained by any of the above discussed methods is rearranged and dehydrated to provide a tertiary diphenyl methyl compound whereby an (8,14) unsaturated double bond is formed by removal of elements of water from the rearranged carbinol and the resulting compounds are oxidized on the active methylene group thereby formed which is adjacent to the said tertiary diphenyl methyl group, to provide the corresponding alpha-beta unsaturated 7-keto polyhydrophenanthrene compounds, which are shown to have androgenic and anabolic activities, which features and compounds are described and claimed in the present application which is a continuation-in-part of application Serial No. 441,646, filed July 6, 1954, which is a continuation-in-part of application Serial No. 198,892 filed Dec. 2, 1950, now abandoned.

In the oxidation step, there are obtained as side products corresponding polyhydronapthone propionic acids and lactones, and these may be converted to the corresponding above mentioned 7-keto polyhydrophenanthrene compounds by treatment with an acetylating agent as by treatment with phenyl acetate-sodium hydride reagent (or with methyl halide magnesium salts) which features and intermediate polyhydronapthalene compounds are described and claimed in copending application Serial Number 647,986, filed March 25, 1957, as a continuation-in-part of application Serial No. 390,747 filed Nov. 6, 1953, as a continuation-in-part of application Serial No. 260,231 filed June 6, 1951, both now abandoned.

The above mentioned 7-keto polyhydrophenanthrenes may be converted to suitable corresponding acetic or propionic acid ester derivatives which may be cyclyzed to corresponding known cyclopentanopolyhydrophenanthrene hormone intermediates, which may be converted by well known methods to natural steroid hormones.

In these fields, two types of nomenclature and numbering are established, (1) in terms of the structural isomers of the abietyl and d-pimaryl types wherein the tricyclic numbering is shown in the formulas given as carbon skeletons

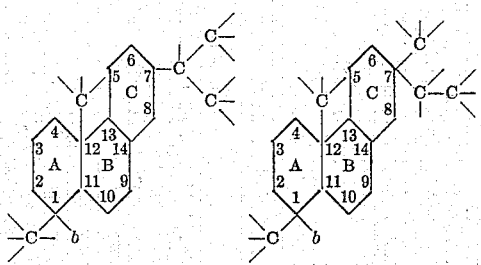

wherein $b$ is a tertiarily bound group such as —COOR, —COHPh$_2$, —CH$_2$OH and —CH$_2$NH$_2$, wherein R and Ph have the definitions set forth herein, and (2) in terms of a polyhydrophenanthrene nomenclature and numbering, wherein the tricyclic numbering is as shown in the same carbon skeletons, as shown in the formula below, both of which

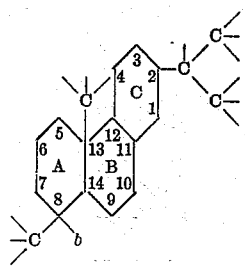

are used herein, to conform with both as used in Fieser and Fieser, Natural Products Related to Phenanthrene, chap. 2, 3rd. ed. 1949, Reinhold Publ. Co., New York, N. Y., see pp. 41, 64 and 85 thereof, particularly.

This application is a continuation-in-part of my copending application Serial No. 441,646 filed July 6, 1954, based on application Serial No. 198,892 filed Dec. 2, 1950, and including certain pertinent disclosures herein, incorporated by reference, previously set forth in applications Serial Nos. 198,893–4–5, said disclosures being first filed on Dec. 2, 1950, and included in the continuations-in-part thereof, the refiled applications Serial Nos. 416,433–4 filed March 15, 1954 and Serial Nos. 610,623–4, filed Sept. 18, 1956 (all now abandoned), and Serial No. 428,852 filed May 10, 1954, respectively.

The preparations for starting materials for this case are described in copending applications Serial Nos. 416,433–4 (and 610,623–4) and Serial No. 428,852 and (Serial Nos. 198,893–4–5) which descriptions are hereby, incorporated herein.

The materials prepared in accordance with descriptions in this case are used in the preparation of other materials as set forth in descriptions in said copending applications Serial Nos. 416,433–4 (and 610,623–4) and Serial No. 428,852 and (Serial Nos. 198,893–4–5) which descriptions and relevant disclosures as set forth in said cases are hereby, incorporated herein.

What I claim is:

1. A process for the production of a 7-keto-13-methyl polyhydrophenanthrene compound having at least one double bond in the 8:14 position and having as a 2-substituent an α-carbonylated radical, said radical being a member of the group consisting of —COCH₃ and —COOR (wherein R is selected from the group consisting of hydrogen, alkyl and aryl radicals) from a corresponding 8,13-dimethyl polyhydrophenanthrene-8-tertiary diphenyl carbinol reactant having as a 2-substituent a radical, said radical being a member of the group consisting of —CH(CH₃)₂, —CH=CH₂, —CHOHCH₃, —CHOHCH₂OH, —COCH₃ and —COOR, the nucleus of which carbinol reactant is resistant to rupture by oxidation under the process conditions and wherein the 13-angular methyl and 8-tertiary diphenyl carbinol groups are in trans relationship, which process comprises subjecting a mixture of said carbinol reactant with a dehydrating agent to a temperature in the range of about 5° up to below about 150° C., whereby the elements of water are removed, mixing the resulting product with a hexavalent chromium compound and subjecting the mixture to a temperature in the range of above about 5° to below about 150° C., whereby the desired ketone is produced.

2. A process of claim 1, wherein there is present in the reaction product resulting from the water eliminating step a corresponding 13-methyl polyhydrophenanthrene-8-tertiary diphenyl methyl compound having at least one nuclear double bond in the 8:14 position and having said 2-substituent corresponding to said carbinol reactant.

3. A process of claim 1, wherein the mixture of carbinol reactant and hexavalent chromium compound is mixed with an orthophosphate producing compound and the resulting mixture is subjected to a temperature in the range of above about 5° and below about 150° C.

4. A process of claim 3, wherein the temperature is maintained below about 80° C.

5. A process of claim 1, wherein the dehydrating agent is an acid anhydride.

6. A process of claim 1, wherein the nucleus contains at least one and at most two halogens.

7. A process of claim 6, followed by subjecting the product to the action of a halogen removing agent whereby a ketone having at most five nuclear double bonds is produced.

8. A process of claim 7, wherein a ketone having an aceto group as a 2-substituent is produced.

9. A process of claim 7, wherein a ketone having at most three nuclear double bonds is produced.

10. A process of claim 8, wherein a ketone having two nuclear double bonds in the 1:2 and 8:14 position is produced.

11. A 7-keto-13-methyl polyhydrophenanthrene compound having one double bond located in the A ring in the 8:14 position and having as a 2-substituent an α-carbonylated radical, said radical being a member of the group consisting of —COCH₃, and —COOR (wherein R is selected from the group consisting of hydrogen, alkyl and aryl radicals) and wherein the phenanthrene nucleus contains at most four double bonds located in the B and C rings of the structural skeleton.

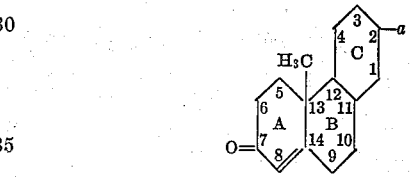

wherein a represents the said 2-substituent group.

12. A compound of claim 11, wherein the nucleus contains at least one and at most two halogens.

13. A compound of claim 11, wherein the nucleus contains at most three double bonds.

14. A compound of claim 11, having an aceto group as a 2-substituent.

15. A compound of claim 11, having a carboxylic radical as a 2-substituent.

16. A compound having a formula

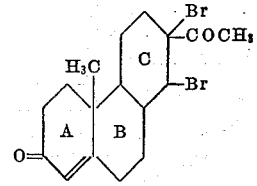

17. A compound having a formula

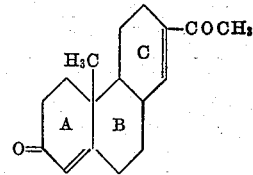

18. A compound having a formula

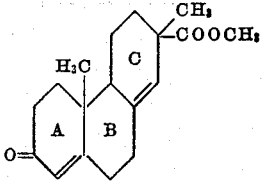

19. A 13-methyl polyhydrophenanthrene-8-tertiary diphenyl methyl compound having one nuclear double bond located in the A ring in the 8:14 position and having as a 2-substituent and α-carbonylated radical, said radical being a member of the group consisting of —COCH₃ and —COOR (wherein R is a member of the group consisting of hydrogen, alkyl and aryl radicals) and wherein the phenanthrene nucleus contains at most four double bonds located in the B and C rings of the structural skeleton.

wherein Ph represents phenyl and $a$ represents the said 2-substituent group.

20. A compound of claim 19, wherein the nucleus contains at least one and at most two halogens.

21. A compound of claim 19, wherein the nucleus contains at most three double bonds.

22. A compound of claim 19, having an aceto group as a 2-substituent.

23. A compound having a formula wherein Ph represents phenyl.

24. A process for the production of a 6-keto-9-methyl polyhydronaphthalene compound having a nuclear double bond located in the A ring in the 5:10 position and having a formula wherein $R_3$ is a member of the group consisting of

—CH₂—COOH, —CH₂—CH₂—CO—CO—CH₃

—CH₂—CH₂—C(—CH₃)(—COOH)(—COCH₃) and

—CH₂—CH₂—C(—CH₃)(—COOH)(—COOR)

(wherein R is selected from the group consisting of hydrogen, alkyl and aryl radicals) and $R_4$ is a member of the group consisting of =O, —COOH

—CH₂—CO—CO—CH₃ from an 8,13-dimethyl polyhydrophenanthrene-8-tertiary diphenyl carbinol reactant having as a 2-substituent a radical which is a member of the group consisting of —CH(CH₃)₂, —CH=CH₂, —CHOHCH₃

—CHOHCH₃OH,

—COCH₃ and —COOR, the phenanthrene nucleus of said reactant having at least one and at most two double bonds located in the C ring of the structural skeleton.

wherein $x$ represents the said 2-substituent and Ph represents phenyl, and wherein the 13-angular methyl and 8-tertiary diphenyl radicals are in trans relationship, which process comprises subjecting a mixture of said carbinol reactant with a dehydrating agent to a temperature in the range of above about 5° to below about 150° C., whereby the elements of water are removed, mixing the resulting product with a hexavalent chromium compound and subjecting the mixture to a temperature in the range above about 5° to below about 150° C., whereby the desired polyhydronaphthalene ketone is produced.

25. A 6-keto-9-methyl polyhydronaphthalene compound having a nuclear double bond located in the A ring in the 5:10 position and having a formula wherein $R_3$ is a member of the group consisting of —CH₂—COOH, —CH₂—CH₂—CO—CO—CH₃,

—CH₂—CH₂—C(—CH₃)(—COOH)(—COCH₃ and

—CH₂—CH₂—C(—CH₃)(—COOH)(—COOR)

(wherein R is selected from the group consisting of hydrogen, alkyl and aryl radicals) and $R_4$ is a member of the group consisting of =O, —COOH and

—CH₂—CO—CO—CH₃

26. A compound having a formula

References Cited in the file of this patent

UNITED STATES PATENTS 2,323,584    Schoeller et al.            July 6, 1943

OTHER REFERENCES

Zeiss: J. Am. Chem. Soc., 70, 858 to 860 (1948).
Zeiss: J. Am. Chem. Soc., 73, 497 to 499 (1951).
Kharasch et al.: J. Org. Chem. 16, 447 to 456 (1951).